Figure 2:
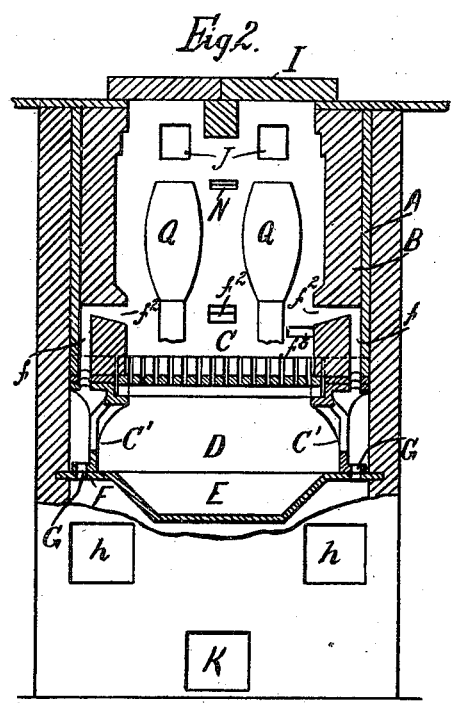

W. MILLER.
CRUCIBLE FURNACE.
APPLICATION FILED JUNE 2, 1909.
972,703.
Patented Oct. 11, 1910.
2 SHEETS—SHEET 1.
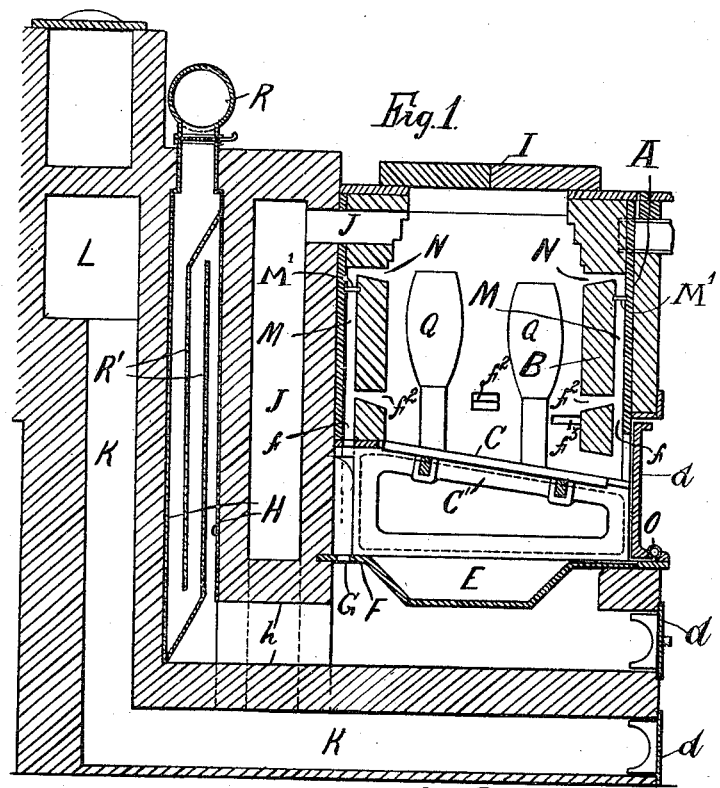
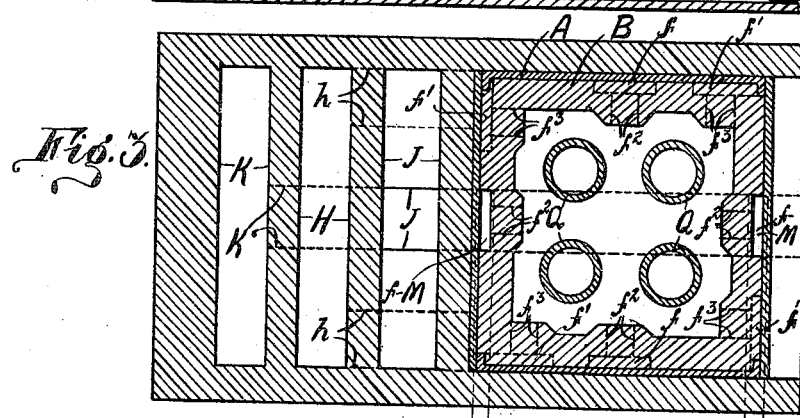
WITNESSES:
INVENTOR,
WILLIAM MILLER,
by
Attorney.

W. MILLER.
CRUCIBLE FURNACE.
APPLICATION FILED JUNE 2, 1909.

972,703.

Patented Oct. 11, 1910.

2 SHEETS—SHEET 2.

WITNESSES:

INVENTOR,
WILLIAM MILLER,
by
Attorney.

UNITED STATES PATENT OFFICE.

WILLIAM MILLER, OF WELLINGTON, ENGLAND.

CRUCIBLE-FURNACE.

972,703.     Specification of Letters Patent.     Patented Oct. 11, 1910.

Application filed June 2, 1909. Serial No. 499,755.

*To all whom it may concern:*

Be it known that I, WILLIAM MILLER, a subject of the King of the United Kingdom of Great Britain and Ireland, and residing at Wellington, Salop, England, have invented a certain new and useful Improvement in Crucible - Furnaces, of which the following is a specification.

This invention relates to crucible furnaces for melting steel and other metals and it consists firstly of an improved construction of such furnaces in which the primary air supply for combustion of the coke or other fuel used to heat the crucible is heated in an arrangement of regenerative flues disposed contiguous to the waste gas flues and also supplemental air so heated is supplied to the furnace over the fuel to effect complete combustion of the fire gases arising from the fuel around the crucible.

Other features of the invention appear from the following description.

In the accompanying drawings, Figures 1 and 2 are vertical sections at right angles to each other and Fig. 3 is a horizontal section of a crucible furnace constructed in accordance with the invention.

Referring to the drawings, the crucible furnace may be of ordinary form having a metallic casing A with a fire clay lining B and a bottom grate C, supported on brackets $C^1$, through which grate the heated air has access and the ash from the fuel drops into an ash-pit D below. The bottom of the ash space is formed by a water tray or trough E having a projecting flange F resting on the brickwork setting of the furnace and formed with perforations or openings G in conjunction with perforations or openings in the brackets $C^1$ for the passage around it of the heated air which is drawn through the branches $h$ of a regenerator flue H in brickwork at the rear of the furnace and passes up to the under side of the furnace grate C, and, if desired, passes up to the upper side of the grate C by passages $f$, $f^1$ and ports $f^2$, $f^3$.

The hot waste gases from the furnace, which is closed by a cover I, escape to and through a waste gas flue or flues J, K, contiguous to the air flue H and thence to a main flue L leading to the chimney so that the air supply is heated. A portion of the air so heated is diverted either through suitable pipes or through passages M which may be provided with regulating valves $M^1$ toward the upper part of the furnace into which it passes by way of ports N at or over the fuel level and serving as a supplemental air supply ignites the unconsumed gases; while water vapor rising from the water tray or trough E which is supplied by a drip pipe O enters with the primary air supply through the furnace grate C and generates combustible gas which is consumed on meeting with the supplemental air supply.

The crucible or crucibles Q (Figs. 1 and 2) placed in the furnace may be removable and may rest on a support on the bottom grate C as is usual, but by preference, and as shown in Fig. 4, the crucible Q is made a fixture and instead of being removed from the furnace to pour off the molten metal is made with a tapping hole $q$ and spout $q^1$ at its lower end from which the metal is drawn, thus avoiding loss by breakage due to handling of the crucible. It will be understood that the furnaces may be adapted to accommodate any number of crucibles.

By the arrangements described the regeneration of the air is continuous and increases in intensity as the flues become hotter. A high temperature can be attained in a short time and thereafter maintained, while great saving of fuel is effected by the introduction of supplemental air to consume the gases in the furnace which would otherwise go to waste.

The flue H may serve as a chamber which supplies the air from the valve controlled air inlet pipe R in a partially heated condition and which chamber may be divided or baffled as shown at $R^1$ (Fig. 1) to extend the heating surface, or the air may be passed through a coil of piping placed in the flue H or other heating chamber. The draft may either be forced or natural.

Access to the flues and ashpit is had through removable doors or plates $d$ which may be luted with clay or otherwise made air-tight.

Having now described my invention what I claim and desire to secure by Letters Patent of the United States is:—

A crucible furnace comprising a fire grate and crucibles supported thereon, the walls of said furnace being built to provide waste gas flues communicating with each other, one leading from the upper end of the furnace, and a regenerative flue disposed between said waste gas flues, said regenerative flue leading to the underside of the fire grate, and vertical passages in communication with the regenerative flue and provided with ports branching therefrom into the interior of the furnace at points adjacent the lower ends of the crucibles, and ports branching therefrom into the interior of the furnace at points adjacent the upper ends of the crucibles, substantially as described.

In testimony whereof I have signed my name to this specification in the presence of two subscribing witnesses.

WILLIAM MILLER.

Witnesses:
WALLACE CRANSTON FAIRWEATHER,
JOHN McCLEARY, Jr.